(12) United States Patent
Batchelder et al.

(10) Patent No.: US 9,090,428 B2
(45) Date of Patent: Jul. 28, 2015

(54) COIL ASSEMBLY HAVING PERMEABLE HUB

(71) Applicant: Stratasys, Inc., Eden Prairie, MN (US)

(72) Inventors: J. Samuel Batchelder, Somers, NY (US); William J. Swanson, St. Paul, MN (US); Kevin C. Johnson, Minneapolis, MN (US); Dominic F. Mannella, Minnetonka, MN (US); Ronald G. Schloesser, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 178 days.

(21) Appl. No.: 13/708,145

(22) Filed: Dec. 7, 2012

(65) Prior Publication Data

US 2014/0158802 A1    Jun. 12, 2014

(51) Int. Cl.
| | |
|---|---|
| B65H 57/00 | (2006.01) |
| B33Y 30/00 | (2015.01) |
| B65H 49/02 | (2006.01) |
| B65H 55/04 | (2006.01) |
| B65H 57/18 | (2006.01) |
| B65H 59/06 | (2006.01) |
| B29C 67/00 | (2006.01) |

(52) U.S. Cl.
CPC ............ B65H 57/00 (2013.01); B29C 67/0085 (2013.01); B33Y 30/00 (2014.12); B65H 49/02 (2013.01); B65H 55/046 (2013.01); B65H 57/18 (2013.01); B65H 59/06 (2013.01)

(58) Field of Classification Search
CPC .. B29C 67/0085; B65H 55/046; B65H 59/06; B65H 57/18; B65H 49/02; B33Y 30/00

USPC .......... 242/159, 172, 176, 600, 612, 613, 901
See application file for complete search history.

(56) References Cited

U.S. PATENT DOCUMENTS

| | | | | |
|---|---|---|---|---|
| 2,634,922 | A | * | 4/1953 | Taylor, Jr. ..................... 242/163 |
| 2,767,938 | A | | 10/1956 | Taylor, Jr. |
| 3,677,491 | A | | 7/1972 | Gerwig |
| 3,689,005 | A | | 9/1972 | Newman |
| 3,877,661 | A | | 4/1975 | Newman |
| 3,923,270 | A | | 12/1975 | Newman et al. |
| 4,009,845 | A | | 3/1977 | Santucci et al. |
| 4,057,203 | A | | 11/1977 | Newman et al. |

(Continued)

FOREIGN PATENT DOCUMENTS

WO    WO 2009088995 A1 *  7/2009

OTHER PUBLICATIONS

Brochure, Reelex Packaging Guide, Guidelines and Recommendations, Reelex Packaging Solutions, Inc., May 2010.

*Primary Examiner* — Michael Mansen
*Assistant Examiner* — Michael Taylor
(74) *Attorney, Agent, or Firm* — Westman, Champlin & Koehler, P.A.

(57) ABSTRACT

A coil assembly comprising a coil of a strand-based material retained in a figure-8 configuration, and having an inner layer and an outer layer, where the inner layer of the coil defines a core region of the coil, and where the coil is configured to unwind loop by loop beginning from the inner layer and moving towards the outer layer as the strand-based material is drawn through a payout hole. The coil assembly also comprises a permeable hub configured to reduce payout entanglement of the strand-based material.

20 Claims, 12 Drawing Sheets

(56) References Cited

U.S. PATENT DOCUMENTS

| | | | |
|---|---|---|---|
| 4,160,533 A | 7/1979 | Kotzur et al. |
| 4,162,050 A | 7/1979 | Wagner et al. |
| 4,274,607 A | 6/1981 | Priest |
| 4,367,853 A | 1/1983 | Kotzur |
| 4,406,419 A | 9/1983 | Kotzur |
| 4,523,723 A | 6/1985 | Kotzur |
| 4,741,495 A | 5/1988 | Kotzur |
| 4,749,347 A | 6/1988 | Valavaara |
| 5,064,136 A | 11/1991 | Hunt |
| 5,079,899 A | 1/1992 | Kurachi |
| 5,100,078 A | 3/1992 | Clark |
| 5,121,329 A | 6/1992 | Crump |
| 5,150,852 A | 9/1992 | Hunt et al. |
| 5,152,476 A | 10/1992 | Moser |
| 5,303,141 A | 4/1994 | Batchelder et al. |
| 5,312,224 A | 5/1994 | Batchelder et al. |
| 5,340,433 A | 8/1994 | Crump |
| 5,368,245 A | 11/1994 | Fore |
| 5,426,722 A | 6/1995 | Batchelder |
| 5,470,026 A | 11/1995 | Kotzur |
| 5,503,785 A | 4/1996 | Crump et al. |
| 5,520,347 A | 5/1996 | Bass et al. |
| 5,653,925 A | 8/1997 | Batchelder |
| 5,738,817 A | 4/1998 | Danforth et al. |
| 5,746,380 A * | 5/1998 | Chung .................. 242/171 |
| 5,764,521 A | 6/1998 | Batchelder et al. |
| 5,866,058 A | 2/1999 | Batchelder et al. |
| 5,939,008 A | 8/1999 | Comb et al. |
| 5,968,561 A | 10/1999 | Batchelder et al. |
| 5,979,812 A | 11/1999 | Kotzur et al. |
| 6,004,124 A | 12/1999 | Swanson et al. |
| 6,022,207 A | 2/2000 | Dahlin et al. |
| 6,028,410 A | 2/2000 | Leavitt et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,086,012 A | 7/2000 | Kotzur et al. |
| 6,109,554 A | 8/2000 | Kotzur et al. |
| 6,129,872 A | 10/2000 | Jang |
| 6,228,923 B1 | 5/2001 | Lombardi et al. |
| 6,250,735 B1 | 6/2001 | Kaneko et al. |
| 6,328,238 B1 | 12/2001 | Chism |
| 6,341,741 B1 | 1/2002 | Kotzur et al. |
| 6,491,163 B1 | 12/2002 | Grcic et al. |
| 6,547,995 B1 | 4/2003 | Comb |
| 6,629,011 B1 | 9/2003 | Calderon et al. |
| 6,645,412 B2 | 11/2003 | Priedeman, Jr. |
| 6,685,866 B2 | 2/2004 | Swanson et al. |
| 6,702,213 B2 | 3/2004 | Kotzur et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,790,403 B1 | 9/2004 | Priedeman, Jr. et al. |
| 6,814,907 B1 | 11/2004 | Comb |
| 6,866,807 B2 | 3/2005 | Comb et al. |
| 6,869,559 B2 | 3/2005 | Hopkins |
| 6,923,634 B2 | 8/2005 | Swanson et al. |
| 6,998,087 B1 | 2/2006 | Hanson et al. |
| 7,063,285 B1 | 6/2006 | Turley et al. |
| 7,122,246 B2 | 10/2006 | Comb et al. |
| 7,156,334 B1 | 1/2007 | Fore, Sr. et al. |
| 7,169,337 B2 | 1/2007 | Swanson et al. |
| 7,172,715 B2 | 2/2007 | Swanson et al. |
| 7,249,726 B2 | 7/2007 | Kotzur |
| 7,297,304 B2 | 11/2007 | Swanson et al. |
| 7,309,038 B2 | 12/2007 | Carroscia |
| 7,314,591 B2 | 1/2008 | Priedeman, Jr. |
| 7,341,214 B2 | 3/2008 | Taatjes et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 8,221,669 B2 | 7/2012 | Batchelder et al. |
| 8,236,227 B2 | 8/2012 | Batchelder et al. |
| 8,403,658 B2 | 3/2013 | Swanson |
| 2005/0173838 A1 | 8/2005 | Priedeman et al. |
| 2005/0224615 A1 | 10/2005 | Miller et al. |
| 2007/0228590 A1 | 10/2007 | LaBossiere et al. |
| 2007/0228592 A1 | 10/2007 | Dunn et al. |
| 2008/0169585 A1 | 7/2008 | Zinniel |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0021580 A1 | 1/2010 | Swanson et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233804 A1 | 9/2011 | Batchelder et al. |
| 2012/0018924 A1 | 1/2012 | Swanson et al. |
| 2012/0068378 A1 | 3/2012 | Swanson et al. |
| 2012/0070523 A1 | 3/2012 | Swanson et al. |
| 2012/0164256 A1 * | 6/2012 | Swanson et al. ............ 425/162 |

\* cited by examiner

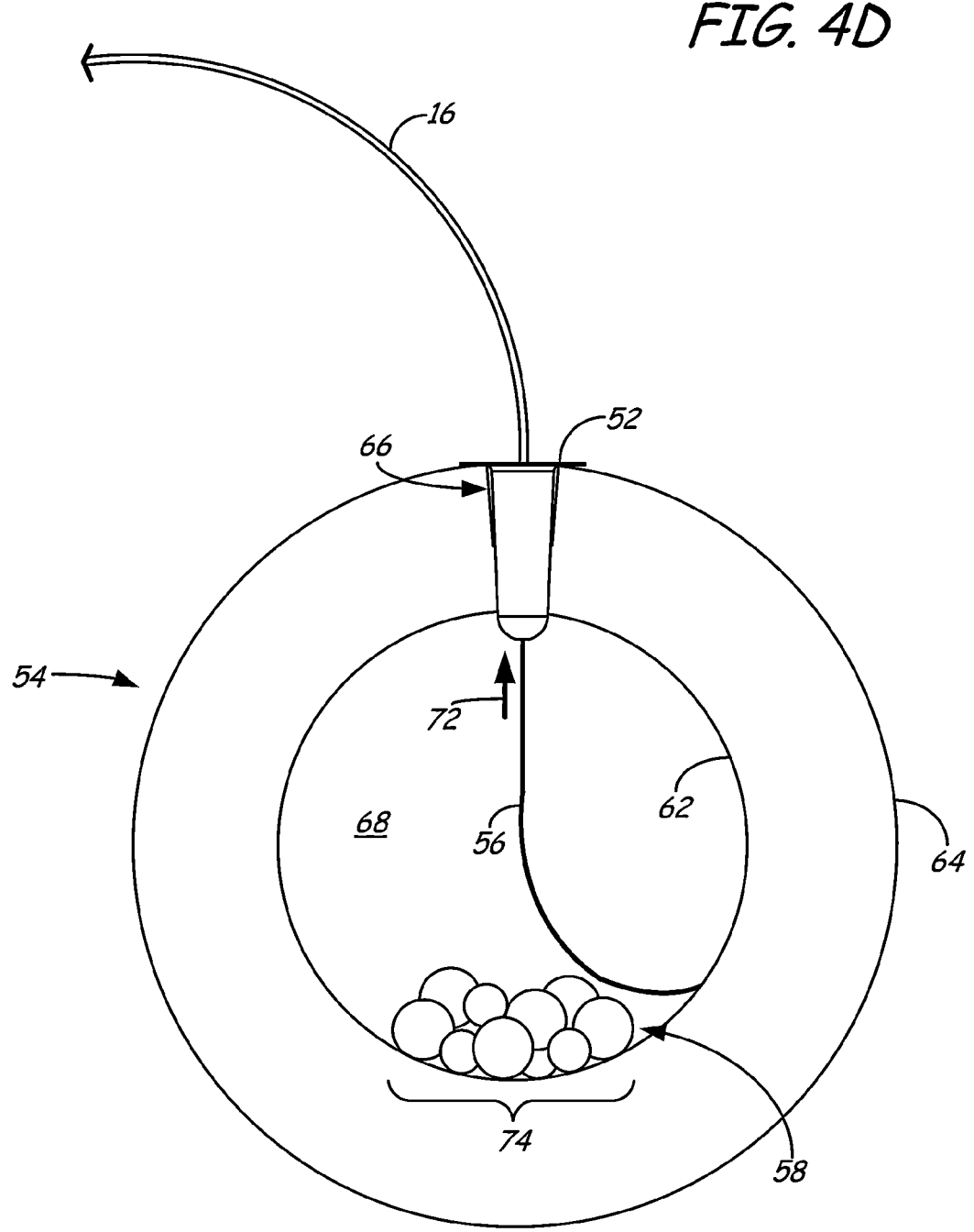

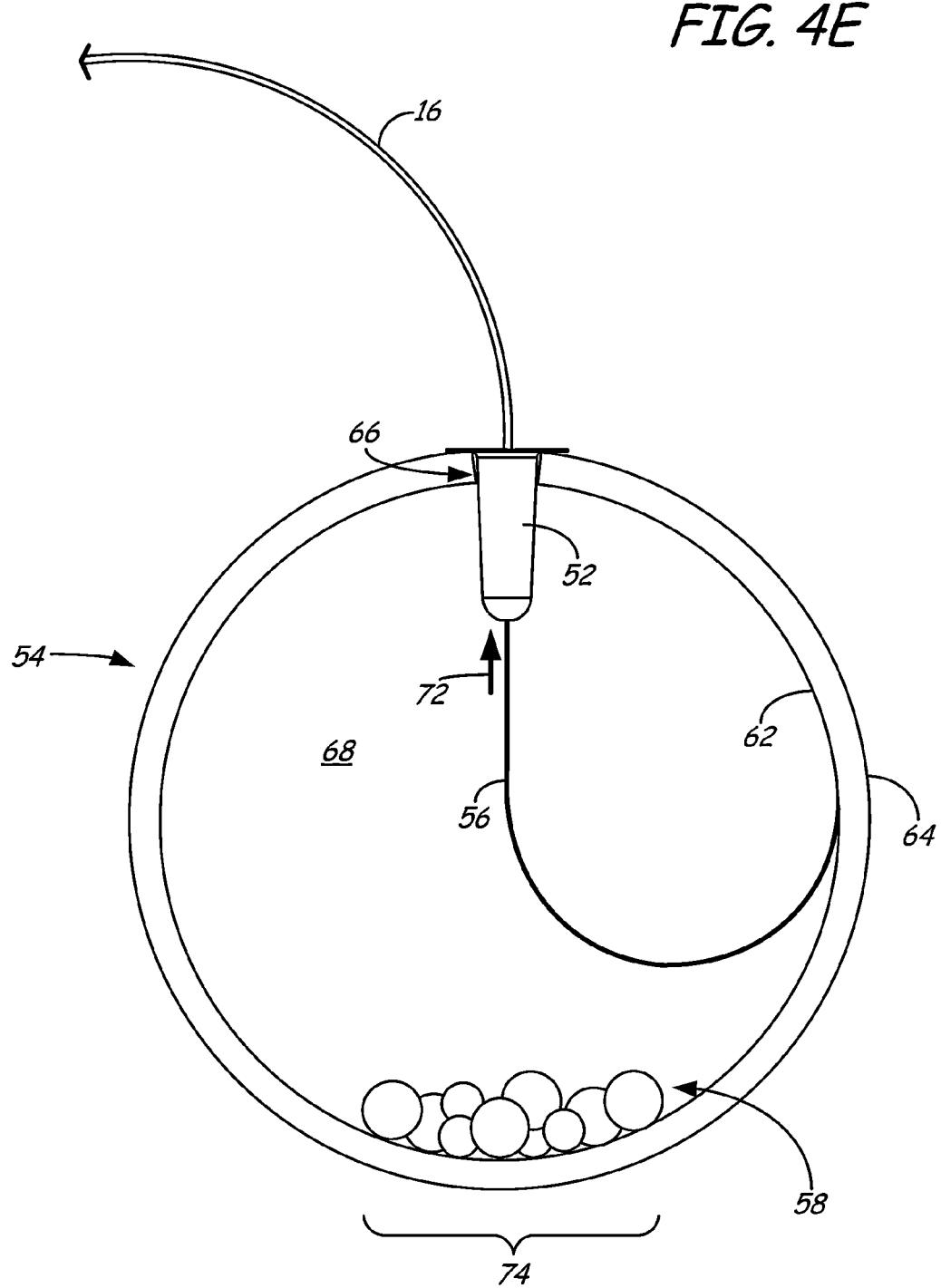

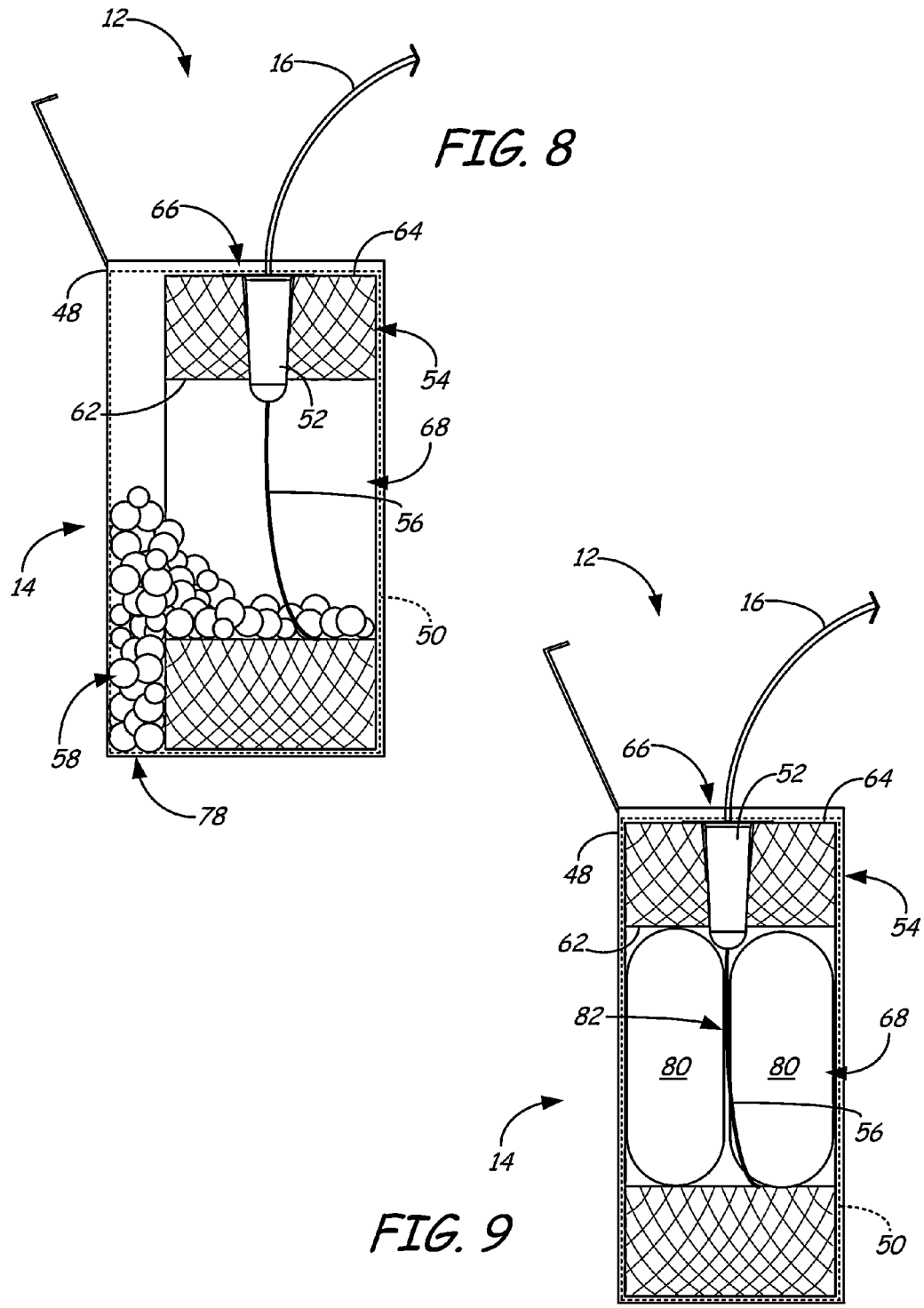

COIL ASSEMBLY HAVING PERMEABLE HUB

BACKGROUND

The present disclosure relates to assemblies for storing, transporting, and delivering strand-based materials, such as filaments, cables, wires, rope, and the like. In particular, the present disclosure preferably relates to coil assemblies for supplying consumable part and support materials to additive manufacturing systems for printing three-dimensional (3D) parts with layer-based, additive manufacturing techniques.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a coil assembly that includes a coil of a strand-based material retained in a figure-8 configuration, and having a payout hole extending from an inner layer of the coil to an outer layer of the coil, where the inner layer of the coil defines a core region of the coil. The coil is configured to unwind loop by loop beginning from the inner layer and moving towards the outer layer as the strand-based material is drawn through the payout hole. The coil assembly also includes a permeable hub retained in the core region of the coil, where the permeable hub is displaceable by the unwinding of the strand-based material, and is configured to prevent the strand-based material from forming more than one loop at a time in the core region as the strand-based material is pulled through the payout hole, thereby preferably reducing payout entanglement.

Another aspect of the present disclosure is directed to a coil assembly for use with an additive manufacturing system. The coil assembly includes a coil of a filament retained in a figure-8 configuration, and having a payout hole extending from an inner layer of the coil to an outer layer of the coil, where the inner layer of the coil defines a core region of the coil. The coil assembly also includes a plurality of displaceable bodies retained in the core region, and configured to prevent the filament from forming more than one loop at a time in the core region. The coil assembly also includes an adapter (e.g., a print head or coupling adapter) configured to engage the additive manufacturing system for printing a 3D part in a layer-by-layer manner from the filament, and a guide tube having a first end configured to receive successive segments of the filament from the coil, and a second end coupled to the adapter for providing the successive segments of the filament to the adapter.

Another aspect of the present disclosure is directed to a method of using a coil assembly. The method includes providing a coil of a strand-based material retained in a figure-8 configuration, which has a payout hole extending from an inner layer of the coil to an outer layer of the coil, and where the inner layer of the coil defines a core region of the coil. The method also includes restricting unwinding of the strand-based material from the inner layer with a plurality of displaceable bodies to prevent the strand-based material from forming more than one loop at a time in the core region, and drawing the stand-based material from the inner layer of the core through the payout hole with a radial force that permeates the drawn strand-based material between the plurality of displaceable bodies.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIGS. 4A-4E are side illustrations of the coil, displaceable bodies, payout tube, and guide tube, of the consumable assembly, illustrating a payout process.

FIG. 8 is a sectional view of another alternative consumable assembly having a lateral pocket to retain a reservoir supply of the displaceable bodies.

FIG. 9 is a sectional view of another alternative consumable assembly, which includes a coil and biasing bodies that function as a permeable hub for the coil.

DETAILED DESCRIPTION

The present disclosure is directed to a coil assembly for storing, transporting, and delivering strand-based materials (e.g., filaments, cables, wires, rope, and the like), where the coil assembly includes a coil having a core region configured to reduce payout entanglement. In a first embodiment, the core region includes a plurality of "displaceable bodies", which are preferably separate and loose bodies that function as a permeable hub by pressing inner windings of the coil against the remaining coil until a given radial force is applied to peel the inner winding. The inner winding may then release from the coil, permeate between the displaceable bodies, and pass through a payout tube.

In a second embodiment, the core region includes "biasing bodies" that also function as a permeable hub by defining a nip zone in the core region of the coil. In this embodiment, the nip zone prevents the inner windings from releasing from the remaining coil until the given radial force is applied to peel the inner winding. The inner winding may then release from the coil, permeate between the biasing bodies at the nip zone, and pass through a payout tube.

Each of these first and second embodiments preferably prevents multiple loops of the inner windings from releasing at the same time and interacting to entangle with each other. Such entanglement may otherwise prevent the inner winding from passing through the payout tube, potentially preventing further payout until the entanglement is removed.

Preferably, the coil assembly functions as a consumable assembly for use in an additive manufacturing system. As such, the following discussion of the coil assembly is made with reference to a consumable assembly for use with an additive manufacturing system, such as an extrusion-based additive manufacturing system. However, in other embodiments, the coil assembly may be used for a variety of different commercial and industrial applications, such as for providing electrical and/or communication cables, wire, rope, and the like.

For use with an additive manufacturing system, the coil assembly may be an easily loadable, removable, and replaceable container device configured to retain a coil of a part or support material consumable filament in a figure-8 configuration. The displaceable bodies and/or biasing bodies in the core region of the coil preferably enable payout of the consumable filament without having the consumable filament become entangled. This allows successive segments of the consumable filament to be drawn from the coil assembly without interruption. Additionally, in comparison to spooled filaments, which are limited in size due to excessive pulling forces that otherwise occur with large spools (which could break the filaments), the use of a coil of the consumable filament (in a figure-8 configuration) also effectively allows the coil assembly to be any desired size (e.g., large coils for large printing runs).

Figure 1:
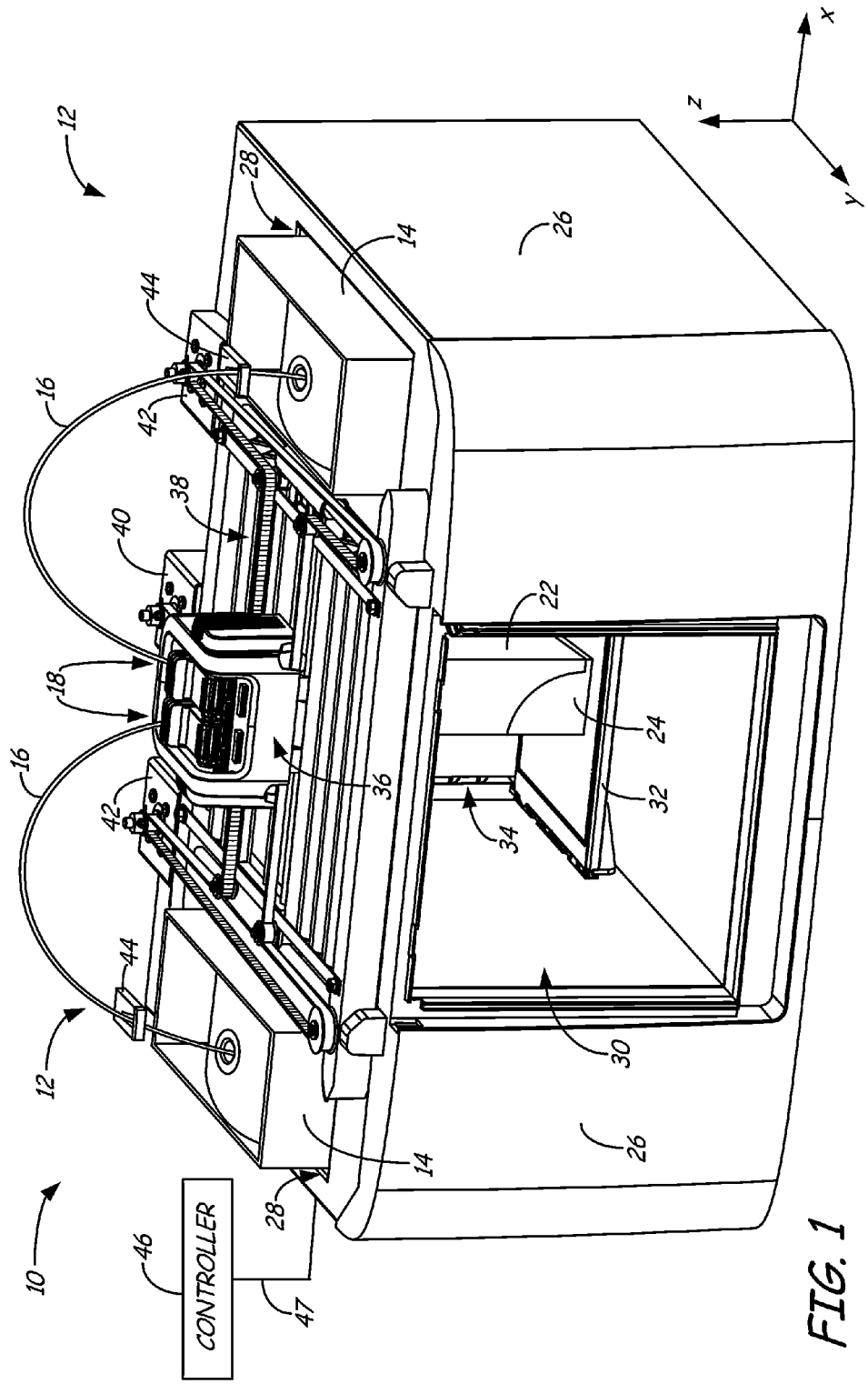
FIG. 1 is a top, front perspective view of an additive manufacturing system in use with consumable assemblies of the present disclosure.

FIG. 1 shows system 10 in use with two consumable or coil assemblies 12 of the present disclosure, where each coil assembly 12 is an easily loadable, removable, and replaceable container device that retains a coil of consumable filament for printing with system 10. Typically, one of the coil assemblies 12 contains a coil of part material filament ("part material consumable assembly"), and the other coil assembly 12 contains a coil of support material filament ("support material consumable assembly"). However, both coil assemblies 12 may be identical in structure.

In the shown embodiment, each coil assembly 12 includes container portion 14, guide tube 16, and print head 18, where container portion 14 retains a coil of a consumable filament having a core region with displaceable bodies and/or biasing bodies, and preferably a payout tube. Guide tube 16 interconnects container portion 14 and print head 18 to supply successive segments of the consumable filament from container portion 14 to print head 18. In this embodiment, guide tube 16 and print head 18 are subcomponents of coil assembly 12, and may be interchanged to and from system 10 with each coil assembly 12. As discussed below, in alternative embodiments, guide tube 16 and/or print head 18 may be components of system 10, rather than subcomponents of coil assemblies 12.

System 10 is an additive manufacturing system for printing 3D parts or models and corresponding support structures (e.g., 3D part 22 and support structure 24) from the part and support material filaments, respectively, of coil assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of coil assemblies 12. Typically, each of bays 28 may be intended to receive either a part material coil assembly 12 or a support material coil assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading coil assemblies 12.

Chamber 30 is an enclosed environment that contains platen 32 for printing 3D part 22 and support structure 24. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 22 and support structure 24 are printed in a layer-by-layer manner, and is supported by platen gantry 34. In some embodiments, platen 32 may also include a flexible polymeric film or liner on which 3D part 22 and support structure 24 are printed. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. Publication Nos. 2010/0283172 and 2012/0164256.

In the shown embodiment, head gantry 38 is a belt-driven gantry assembly configured to move head carriage 36 (and the retained print heads 18) in (or substantially in) a horizontal x-y plane above chamber 30, and is powered by x-y motors 42. Examples of suitable gantry assemblies for head gantry 38 include those disclosed in Comb et al., U.S. Pat. No. 13/242,561.

Additional examples of suitable devices for print heads 18, and the connections between print heads 18 and head gantry 38 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. In these embodiments, coil assembly 12 may optionally include a coupling adapter (not shown), which is configured to engage a reciprocating mating panel of system 10 that is remote from head carriage 36, as discussed in U.S. Publication No. 2013/0164960. As such, coil assembly 12 may include any suitable adapter configured to engage with system 10 for printing 3D part 22 or support structure 24 in a layer-by-layer manner from the filament, such as a print head (e.g., print heads 18) and/or a coupling adapter.

In an alternative embodiment, platen 32 may be configured to move in the horizontal x-y plane within chamber 30, and head carriage 36 (and print heads 18) may be configured to move along the z-axis. Other similar arrangements may also be used such that one or both of platen 32 and print heads 18 are moveable relative to each other. Platen 32 and head carriage 36 (and print heads 18) may also be oriented along different axes. For example, platen 32 may be oriented vertically and print heads 18 may print 3D part 22 and support structure 24 along the x-axis or the y-axis.

As further shown in FIG. 1, system 10 may also include a pair of sensor assemblies 44, which, in the shown embodiment, are located adjacent to bays 28. Sensor assemblies 44 are configured to receive and retain guide tubes 16, while also providing sufficient ranges of movement for guide tubes 16 and print heads 18. Sensor assemblies 44 are also configured to read encoded markings from successive segments of the consumable filaments moving through guide tubes 16. Examples of suitable devices for sensor assemblies 44 include those disclosed in Batchelder et al., U.S. Patent Application Publication Nos. 2011/0117268, 2011/0121476, and 2011/0233804.

System 10 also includes controller 46, which is one or more control circuits configured to monitor and operate the components of system 10. For example, one or more of the control functions performed by controller 46 can be implemented in hardware, software, firmware, and the like, or a combination thereof. Controller 46 may communicate over communication line 47 with print heads 18, chamber 30 (e.g., with a heating unit for chamber 30), head carriage 36, motors 40 and 42, sensor assemblies 44, and various sensors, calibration devices, display devices, and/or user input devices. In some embodiments, controller 46 may also communicate with one or more of bays 28, platen 32, platen gantry 34, head gantry 38, and any other suitable component of system 10.

While illustrated as a single signal line, communication line 47 may include one or more electrical, optical, and/or wireless signal lines, allowing controller 46 to communicate with various components of system 10. Furthermore, while illustrated outside of system 10, controller 46 and communication line 47 may be internal components to system 10. System 10 and/or controller 46 may also communicate with one or more computer-based systems (not shown), which may include computer-based hardware, such as data storage devices, processors, memory modules and the like for generating, storing, and transmitting tool path and related printing instructions to system 10.

During operation, controller 46 may direct z-axis motor 40 and platen gantry 34 to move platen 32 to a predetermined height within chamber 30. Controller 46 may then direct motors 42 and head gantry 38 to move head carriage 36 (and the retained print heads 18) around in the horizontal x-y plane above chamber 30. Controller 46 may also direct print heads 18 to selectively draw successive segments of the consumable filaments from container portions 14 and through guide tubes 16, respectively.

Each print head 18 thermally melts the successive segments of the received consumable filament such that it becomes a molten material, thereby allowing the molten material to be extruded and deposited onto platen 32 for printing 3D part 22 and support structure 24 in a layer-by-layer manner. After the print operation is complete, the resulting 3D part 32 and support structure 24 may be removed from chamber 30, and support structure 24 may be removed from 3D part 22. 3D part 22 may then undergo one or more additional post-processing steps.

Figure 2:
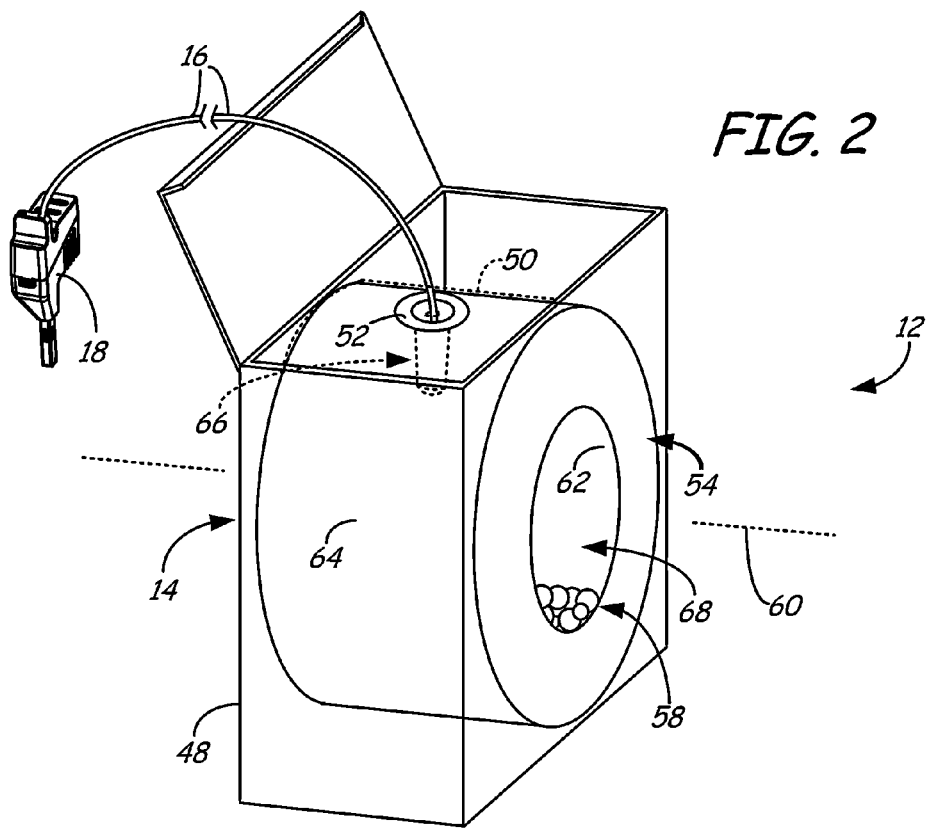
FIG. 2 is a top, front perspective view of one of the consumable assemblies, which includes a coil and displaceable bodies that function as a permeable hub for the coil.

As discussed above, coil assemblies 12 are removable and replaceable container devices. As shown in FIG. 2, coil assembly 12 also includes box 48, liner 50, payout tube 52, coil 54 of a consumable filament 56 for use in system 10 (e.g., a part or support material filament, shown below in FIG. 3), and displaceable bodies 58. In the shown example, box 48 is a rigid or semi-rigid container for consumable assembly 14, and may include a variety of indicia and graphics for identifying the material type for coil 54. Box 48 may also include a compartment to retain guide tube 16 and print head 18 during transportation and storage.

Liner 50 preferably encases and seals payout tube 52, coil 54, and displaceable bodies 58 within box 48, and may be one or more polymeric bags, wrappings (e.g., shrink wrap liner), metallic foil casings, metalized-plastic bags (e.g., metal-coated plastic bags), and the like. In some embodiments, liner 50 desirably prevents or substantially prevents ambient conditions from reaching coil 54. For example, liner 50 may be a moisture-impermeable liner or sheath to provide a moisture barrier, a gas-impermeable liner or sheath to provide a gas barrier, a particulate-impermeable liner or sheath to provide a dust barrier, and the like. Liner 50 may also be opaque to reduce light exposure (e.g., ultraviolet light exposure), to reduce the risk of degrading filament 56 of coil 54 over extended periods of storage.

In the case of moisture-sensitive materials, filament 56 is desirably provided to print head 18 in a dry state (e.g., less than 300 parts-per-million by weight of water) to prevent moisture from negatively affecting the extrusion process. As such, liner 50 may provide a moisture barrier for filament 56 during transportation, storage, and use in system 10. As discussed below, in some embodiments, displaceable bodies 58 may include desiccant materials to assist in drying filament 56 during storage, transportation, and use with system 10.

In an alternative embodiment, liner 50 may be omitted and box 48 may provide the barrier against ambient conditions (e.g., moisture resistance). In this embodiment, guide tube 16 may extend through a sealed opening in box 48, adjacent to payout tube 52, to allow print head 18 to be loaded to head carriage 36 of system 10. In another alternative embodiment, box 48 may be omitted, and payout tube 52, coil 54, and displaceable bodies 58 may be retained and sealed solely within liner 50. In this embodiment, the consumable assembly within liner 50 may be directly loaded to bay 28 or otherwise made available for use with system 10.

Prior to use in system 10, the user may open box 48 and remove guide tube 16 and print head 18, and engage guide tube 16 through sensor assembly 44. The user may then insert print head 18 into head carriage 36 as discussed in Swanson et al., U.S. Publication No. 2012/0164256. As also discussed in Swanson et al., U.S. Publication No. 2010/0283172 and 2012/0164256, filament 56 in the coil assembly 12 may be pre-fed through guide tube 16, and into print head 18.

In an alternative embodiment, coil assembly 12 may be arranged such that guide tube 16 is initially disconnected from payout tube 52, and liner 50 may be sealed over payout tube 52. In this embodiment, the leading end of filament 56 may extend through payout tube 52 and be pressed against the outer side of coil 54 within liner 50. Prior to use in system 10, the user may puncture or otherwise open liner 50 at payout tube 52, manually feed the leading end of filament 56 through guide tube 16 and into print head 18, and secure the inlet end of guide tube 16 to payout tube 52.

In these embodiments, print head 18 may include a filament drive mechanism for drawing successive segments of the consumable filament from container portion 14 and through guide tube 16. As such, once each coil assembly 12 is loaded, system 10 may begin to use the consumable filaments during one or more pre-printing operations (e.g., calibration routines) or during print operations without requiring the user to perform any additional loading tasks.

Payout tube 52 is a rigid component that extends through coil 54 and is configured to receive guide tube 16, as shown. In particular, during use, guide tube 16 desirably extends through liner 50 in a sealed arrangement to maintain the barrier from ambient conditions. For example, guide tube 16 may be secured to an opening through liner 50 with a sealing adhesive. Payout tube 52 reduces the risk of entanglement as filament 56 unwinds from coil 54, as discussed in Mannella et al., U.S. Publication No. 2013/0161432.

As can be appreciated, if filament 56 becomes entangled during payout, the resulting entanglement will be caught in guide tube 16 or print head 18 (or fail to even enter guide tube 16), preventing filament 56 from reaching a liquefier of print head 18. This would disrupt the printing operation in system 10, which relies on accurate timings of the deposited part and support materials, thereby impeding the printing operation. Similar entanglements can occur with alternative strand-based materials, such as electrical or communication cables, which can become entangled and stuck within the container during payout, particularly at the end of the coil.

Figure 3:
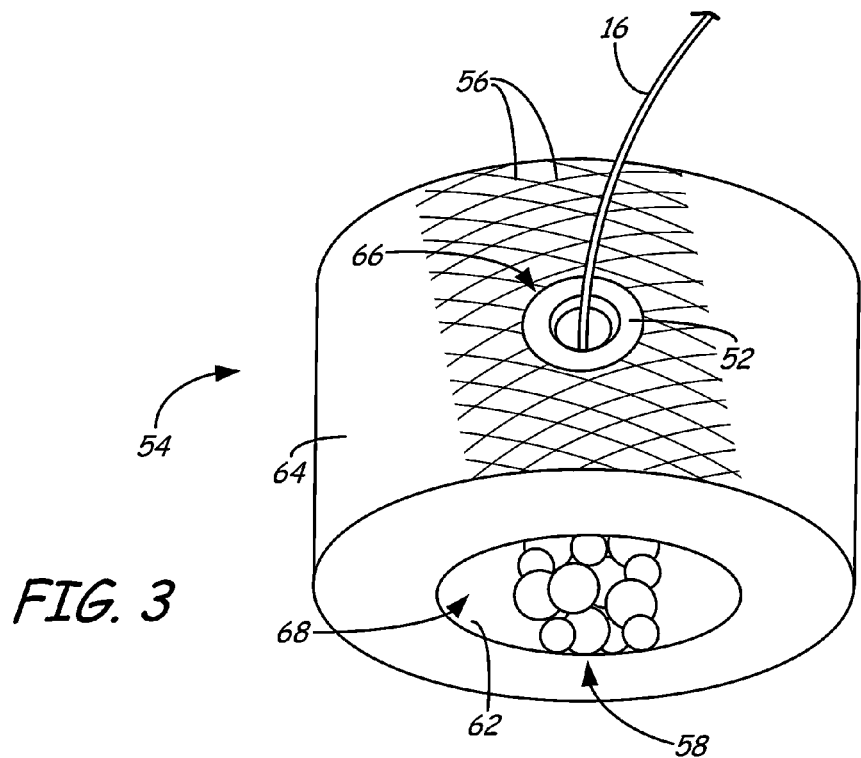
FIG. 3 is a top perspective view of the coil, the displaceable bodies, a payout tube, a guide tube of the consumable assembly.

As shown in FIGS. 2 and 3, coil 54 (and coil assembly 12) is preferably oriented vertically when used with system 10, such that coil 54 has an axis 60 that is substantially aligned in the horizontal x-y plane. Filament 56 of coil 54 is retained in a figure-8 configuration, as is well known for filaments such as wire, rope, communication cables, and the like, and is described in references such as U.S. Pat. Nos. 2,767,938 and 4,406,419, and the references cited therein. The figure-8 configuration of coil 54 has an inner layer 62 and an outer layer 64, and provides a payout hole 66 that extends through coil 54 between inner layer 62 and outer layer 64 for receiving payout tube 52, as discussed in Mannella et al., U.S. Publication No. 2013/0161432. Inner layer 62 defines core region 68, where displaceable bodies 58 preferably reside during storage and use with system 10, and through which filament 56 passes while being drawn.

Suitable consumable filaments for filament 56 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495. Furthermore, the consumable filaments may each include encoded markings, as disclosed in Batchelder et al., U.S. Patent Application Publication Nos. 2011/0117268, 2011/0121476, and 2011/0233804, which may be used with sensor assemblies 44 of system 10.

Filament 56 desirably exhibits physical properties that allow it to be used as a consumable material in system 10. In particular, filament 56 is desirably flexible along its length to allow it to be retained in the figure-8 configuration and to be fed through guide tube 16 without plastically deforming or fracturing. For example, in one embodiment, filament 56 is capable of withstanding elastic strains greater than t/2r (or in some embodiments, t/r), where "t" is an average cross-sectional thickness or average diameter of filament 56 in the plane of curvature, and "r" is a bend radius.

However, filament 56 also desirably has suitable thermal properties (e.g., a suitable glass transition temperature) for use in system 10. Increasing flexibility of filament 56, such as with the use of plasticizers, typically reduces the thermal properties of filament 56. As such, to maintain suitable thermal properties, filament 56 is typically stiffer (i.e., less flexible) than many strand materials used with current payout tubes.

Additionally, filament 56 also desirably exhibits low compressibility such that its axial compression doesn't cause filament 56 to be seized within a liquefier of print head 18.

Examples of suitable Young's modulus values for the polymeric compositions of filament 56 include modulus values of about 0.2 gigapascals (GPa) (about 30,000 pounds-per-square inch (psi)) or greater, where the Young's modulus values are measured pursuant to ASTM D638-08. In some embodiments, suitable Young's modulus range from about 1.0 GPa (about 145,000 psi) to about 5.0 GPa (about 725,000 psi). In additional embodiments, suitable Young's modulus values range from about 1.5 GPa (about 200,000 psi) to about 3.0 GPa (about 440,000 psi).

In the shown embodiment, filament 56 has a substantially cylindrical geometry (i.e., a substantially circular cross section). In this embodiment, filament 56 may have an average diameter ranging from about 1.0 millimeter (about 0.04 inches) to about 3.0 millimeters (about 0.12 inches). In some embodiments, the average diameter of filament 56 preferably ranges from about 1.0 millimeter (about 0.04 inches) to about 1.5 millimeters (about 0.06 inches). In other embodiments, the average diameter of filament 56 preferably ranges from about 1.5 millimeters (about 0.06 inches) to about 2.0 millimeters (about 0.08 inches). As used herein, the term "average diameter" of a filament is an average based on a 100-foot segment length of the filament. The above-discussed ranges for the average diameter of filament 56 may alternatively be referred to based on the average cross-sectional area of filament 56.

Alternatively, filament 56 may have a non-cylindrical geometry, such as a ribbon filament as disclosed in Batchelder et al., U.S. Pat. No. 8,221,669. In this embodiment, print head 18 may include a ribbon liquefier assembly as disclosed in Batchelder et al., U.S. Application Publication No. 2011/0074065; and in Swanson et al., U.S. Application Publication No. 2012/0070523. Ribbon filaments are particularly suitable for use with coil assembly 12 having coil 54 and displaceable bodies 58. First, ribbon filaments exhibit a greater resistance to twisting than cylindrical filaments, which further reduces the risk of payout entanglement. Additionally, the ribbon filaments have a greater surface area for contact with displaceable bodies 58, thereby allowing fewer displaceable bodies 58 to press the ribbon filaments against coil 54.

In the ribbon-filament embodiment, filament 56 may have an average width and an average thickness, where the average width for filament 56 may range from about 1.0 millimeter (about 0.04 inches) to about 10.2 millimeters (about 0.40 inches), and more preferably from about 1.5 millimeters (about 0.06 inches) to about 7.6 millimeters (about 0.30 inches). The average thickness for filament 56 may range from about 0.38 millimeters (about 0.015 inches) to about 1.3 millimeters (about 0.05 inches), and more preferably from about 0.51 millimeters (about 0.02 inches) to about 1.0 millimeter (about 0.04 inches).

As used herein, the terms "average width" and "average thickness" of a filament are each an average based on a 100-foot segment length of the filament. The above-discussed ranges for the average width and the average thickness may alternatively be referred to based on the average cross-sectional area of filament 56. Furthermore, the cross-sectional dimensions of filament 56 for the ribbon-filament embodiment may also be referred to based on the cross-sectional aspect ratio of the average width to the average thickness. For example, the cross-sectional aspect ratio (width-to-thickness) may range from about 2:1 to about 20:1. In some embodiments, the cross-sectional aspect ratio ranges from about 2.5:1 to about 10:1, and in further embodiments from about 3:1 to about 10:1.

The length of filament 56 may be any suitable length, and is preferably more than about 100 feet. In additional embodiments, filament 56 may include topographical surfaces patterns (e.g., tracks) as disclosed in Batchelder et al., U.S. Pat. No. 8,236,227; and/or may include encoded markings as disclosed in Batchelder et al., U.S. Application Publication No. 2011/0233804.

Coil 54 of filament 56 may be any desired size, as mentioned above. For instance, when used with larger additive manufacturing systems, such as extrusion-based systems developed by Stratasys, Inc., Eden Prairie, Minn. under the trademarks FDM, FUSED DEPOSITION MODELING, and FORTUS, coil 54 may be larger to accommodate the larger printing volumes. For example, coil 54 of filament 56 may have an average outer diameter ranging from about 18 inches to about 24 inches, more preferably from about 20 inches to about 22 inches; an average inner diameter ranging from about 6 inches to about 12 inches, more preferably from about 8 inches to about 10 inches; and a depth of about 10 inches.

Alternatively, when used with smaller additive manufacturing systems, such as extrusion-based systems developed by Stratasys, Inc., Eden Prairie, Minn. under the trademarks FDM, FUSED DEPOSITION MODELING, and MOJO, coil 54 may be smaller to accommodate the smaller printing volumes. For example, coil 54 of filament 56 may have an average outer diameter ranging from about 8 inches to about 14 inches, more preferably from about 10 inches to about 12 inches; an average inner diameter ranging from about 4 inches to about 8 inches, more preferably from about 5 inches to about 7 inches; and a depth of about 3 inches.

As further shown in FIGS. 2 and 3, displaceable bodies 58 are a plurality of balls or other suitable bodies that rest on inner layer 62 at the bottom of core region 68 under the weight of gravity. As discussed below, displaceable bodies 58 are configured to press the inner windings of filament 56 against inner layer 62 of coil 54 until a sufficient radial force is applied to release filament 56. This preferably allows only a single loop of filament 56 to unwind at a time from coil 54, which prevents multiple loops of filament 56 from interacting and entangling.

Figure 4A:
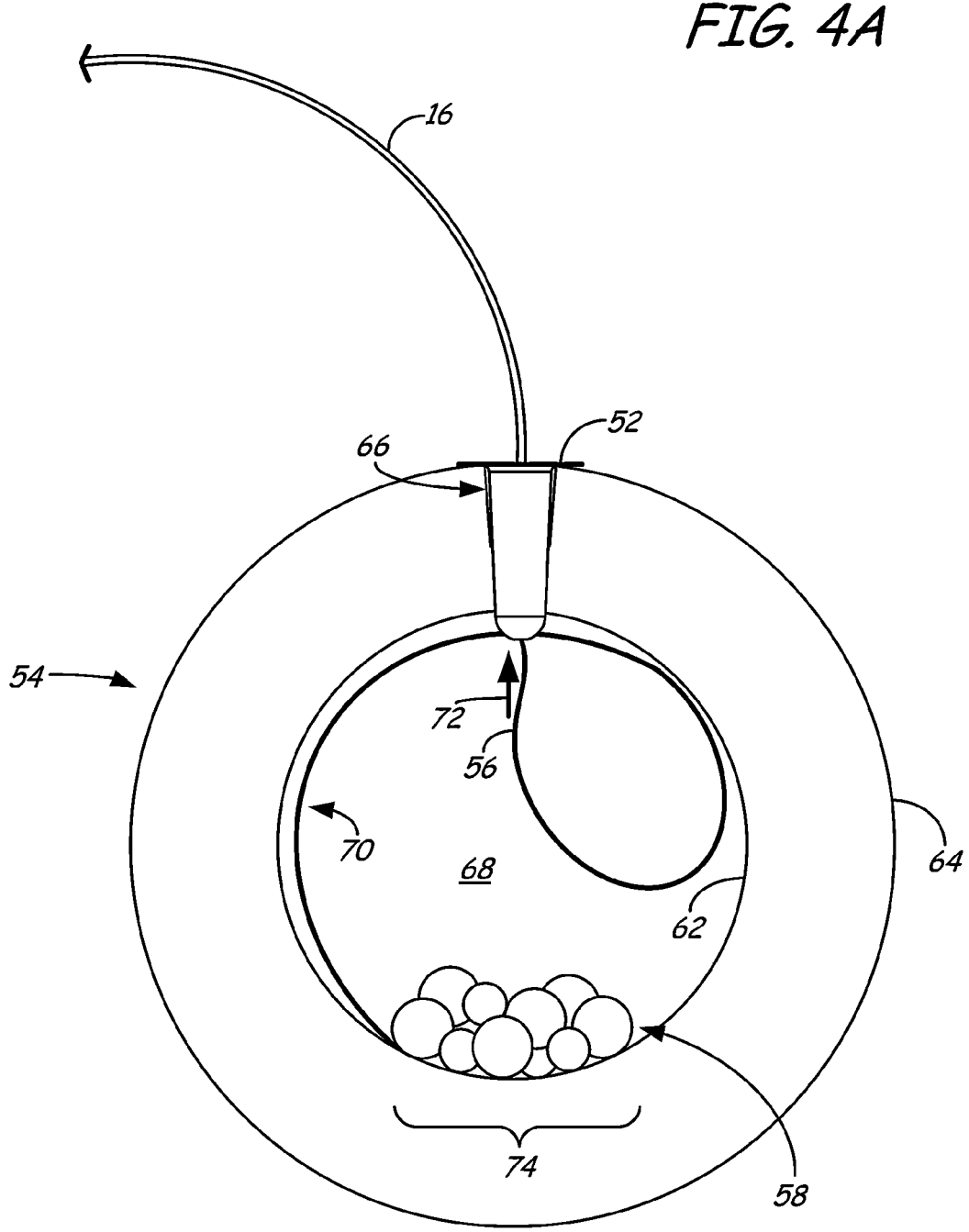

This is illustrated in FIGS. 4A-4E, which depict a process for drawing filament 56 from coil 54, such as during a printing operation with system 10. As shown in FIG. 4A, during payout, print head 18 (or other drive mechanism) may pull or otherwise draw filament as an inner winding from inner layer 62 of coil 54, following the figure-8 configuration. This is illustrated by arrow 72. As print head 18 continues to pull filament 56 from coil 54, a segment of filament 56 may become slack and release from inner layer 62 to form loop 70.

Loop 70 may extend around core region 68 until it reaches displaceable bodies 58 at the bottom of core region 68, referred to as bottom zone 74. The weight of bodies 58 at bottom zone 74 press filament 56 against inner layer 62, preventing loop 70 from further unwinding. This prevents multiple loops from unwinding at the same time, which can otherwise interact and entangle with each other. The size of bottom zone 74 may vary depending on the number and sizes of displaceable bodies 58, the dimensions of coil 54, and the cross-sectional dimensions of filament 56.

Figure 4B:
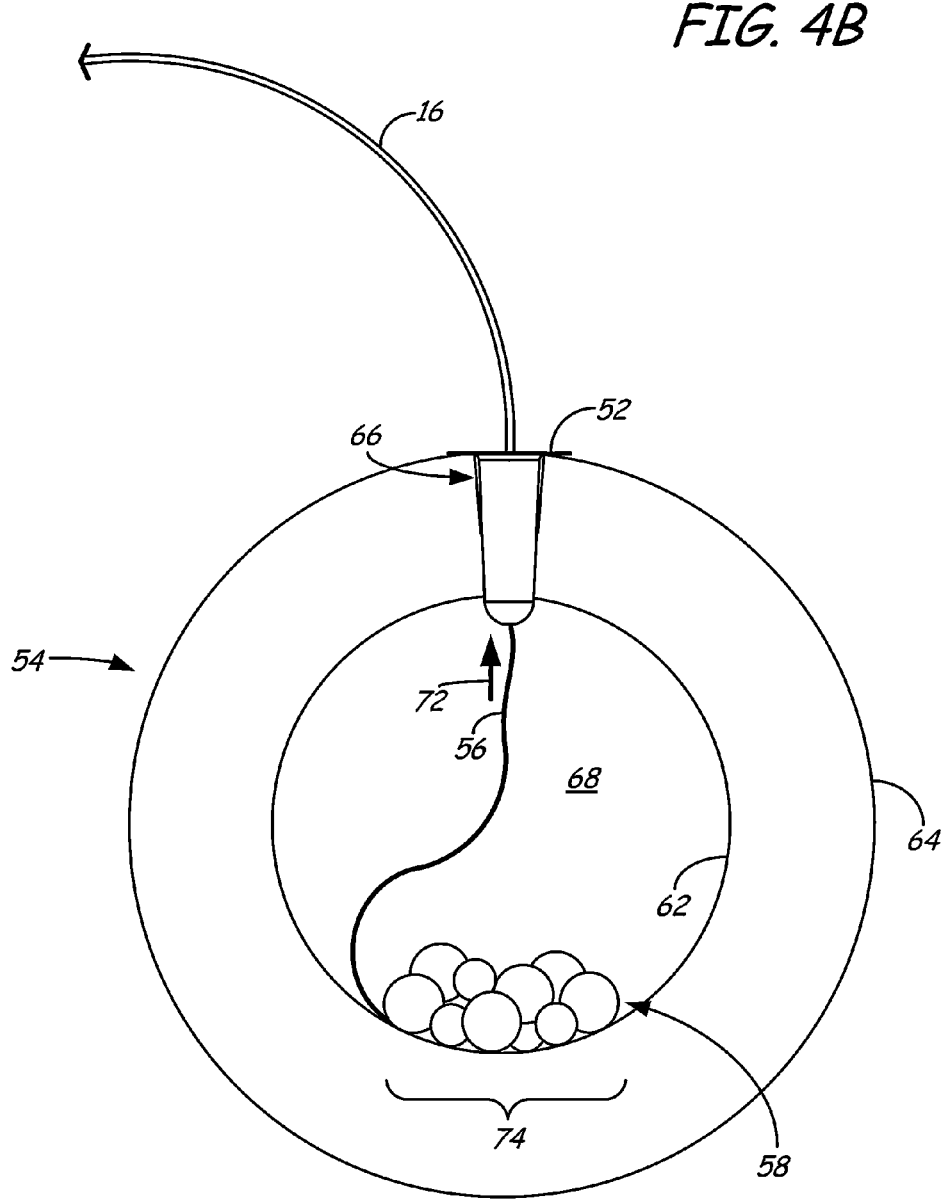

Because loop 70 is slack, little or no radial forces are applied to the segment of loop 70 at bottom zone 74. However, as shown in FIG. 4B, as filament 56 continues to be pulled through payout tube 52, loop 70 shrinks and dissipates, until the pulling of filament 56 applies a direct radial force on the segment of filament 56 that is pressed against coil 54 at bottom zone 74.

Figure 4C:
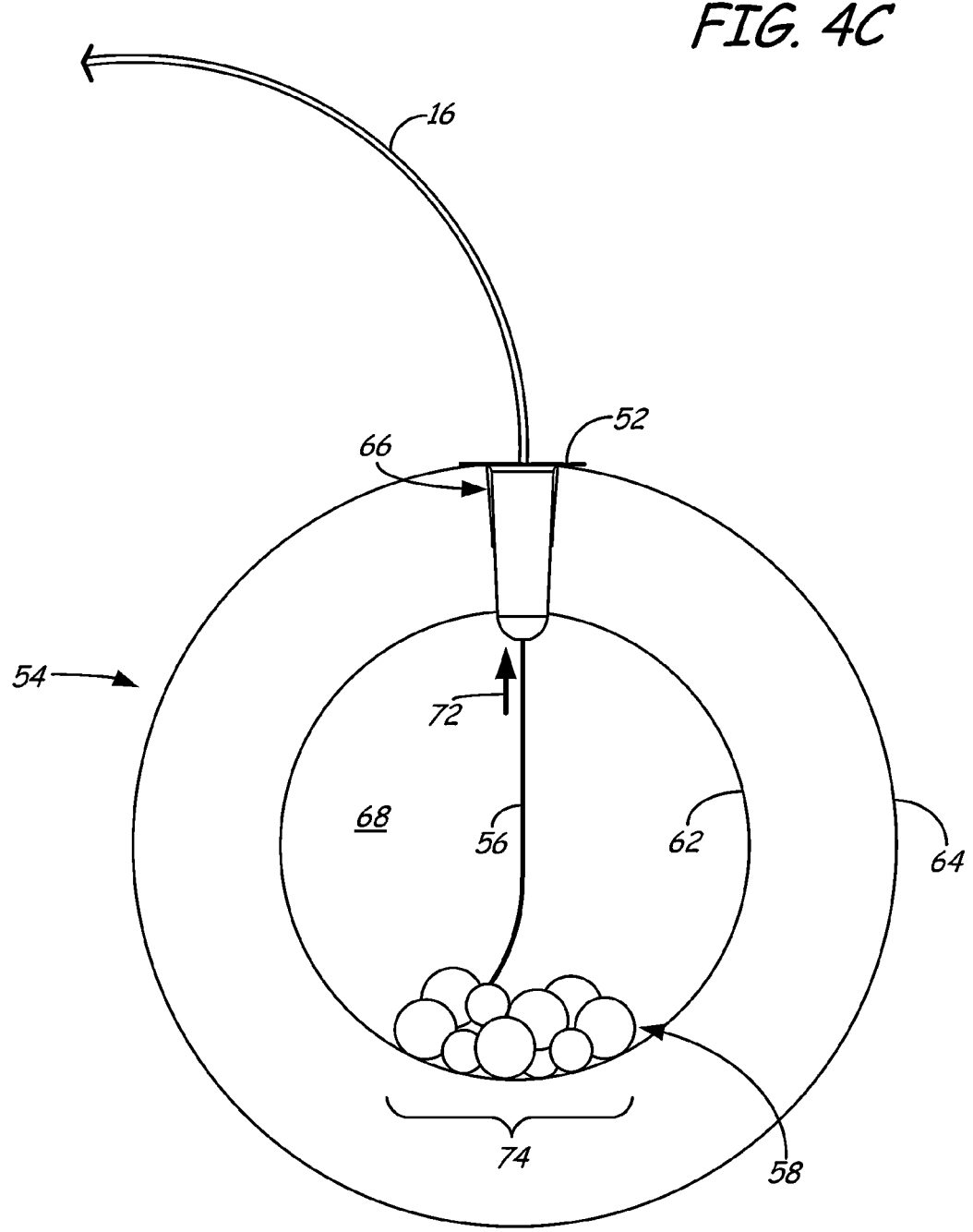

As shown in FIG. 4C, when the segment of filament 56 at bottom zone 74 is drawn with a sufficient radial force, filament 56 permeates between the individual bodies 58, which can move or otherwise displace them. This releases filament 56 from inner layer 62 of coil 54, as shown in FIG. 4D, allowing subsequent segments of filament 56 to unwind from inner layer 62. This same process may then be repeated, where successive segments of filament 56 may become slack to form subsequent loops. However, displaceable bodies 58 preferably only allow a single loop to form at a time, where each loop preferably dissipates prior to a subsequent loop being formed. This prevents multiple loops from interacting and entangling with each other.

Furthermore, the continued drawing of filament 56 eventually expands the diameter of inner layer 62, as shown in FIG. 4E. Due to their displaceable nature, the individual bodies 58 may roll and displace to conform to the increasing diameter of coil 54. This allows bodies 58 to continue to press the inner windings of filament 56 against coil 54, thereby reducing the risk of payout entanglement.

As briefly mentioned above, displaceable bodies 58 may include a plurality of balls or other suitable bodies that press the inner windings of filament 56 against coil 54 until a sufficient radial force is applied to release filament 56. The radial force that displaceable bodies 58 require to surpass is desirably high enough to prevent filament 56 from prematurely releasing from coil 54 as multiple loops. This may depend on multiple factors, such as the size and taughtness of coil 54, as well as the composition, surface topography, and cross-sectional dimensions of filament 56.

However, the required radial force is also desirably low enough to prevent print head 18 (or other drive mechanism) from pulling on filament 56 with fluctuating draw rates. Fluctuations in the draw rate could disrupt the printing operation in system 10, which relies on accurate timings of the deposited part and support materials, thereby impeding the printing operation. Fortunately, the radial force required to prevent filament 56 from prematurely releasing from coil 54 at bottom zone 54 can be substantially lower than radial forces typically required to generate fluctuating draw rates with print head 18.

For example, when retained in coil 54, filament 56 is wound with a given average radius of curvature "R". To contort itself from its wound state in coil 52 for payout through payout tube 52, filament 56 is typically required to bend at an average radius of R/2 or less. This contortion constitutes the bulk of the radial forces required to release filament 56 from coil 54, and is proportional to the cross-sectional area (e.g., diameter) of filament 56, the stiffness (i.e., Young's Modulus) of filament 56, and the like. This resulting radial force (e.g., less than 25 grams) is substantially lower than the radial forces typically required to generate fluctuating draw rates with print head 18 (or with another coupling adapter).

Displaceable bodies 58 may have a variety of different geometries so long as they do not themselves entangle filament 56 during payout. Examples of suitable geometries for each displaceable body 58 include spheriods, ovoids, toroids, and the like, where the dimensions in any coordinate direction is preferably less than a factor of five from any other dimension, more preferably less than a factor of three, and even more preferably less than a factor of two. For example, if a given displaceable body 58 has a one-inch length, its width and height are each preferably less than five inches, more preferably less than three inches, and even more preferably less than two inches. This reduces the risk of filament 56 entangling with displaceable bodies 58.

Furthermore, displaceable bodies 58 may have the same or different sizes and/or geometries. For example, in some embodiments, displaceable bodies 58 may each be spheroids (i.e., balls), but may have different diameters to provide a size distribution of two or more different diameters. The use of a size distribution allows smaller displaceable bodies 58 to fit in the interstitial spaces between larger bodies 58, thereby increasing surface contact with filament at bottom zone 74. This is particularly useful for coil 54 having large dimensions.

In embodiments in which displaceable bodies 58 are spheroids, for the above-discussed examples of filament 56, preferred average diameters for displaceable bodies 58 include diameters up to about 10 inches, more preferably from about 0.5 inches to about 5 inches, more preferably from about 1 inch to about 3 inches. As used herein, the term "average diameter" for spheroid displaceable bodies 58 refers to an average diameter of an individual body 58, rather than to an average of all of the displaceable bodies 58. This distinction is preferred when using size distributions, which can significantly alter the average diameter of all of the displaceable bodies 58.

In some embodiments, coil assembly 12 is substantially or entirely free of displaceable bodies 58 having average diameters less than about 0.1 inches, and more preferably less than about 0.3 inches, to prevent the individual bodies from becoming entrapped in coil 54. Entrapped particles in coil 54 may potentially prevent a smooth release of filament 56 during payout, which can impair printing with print head 18.

Displaceable bodies 58 also preferably have tacky surfaces that reduce slippage of filament 56. The tackiness of displaceable bodies may be obtained by proper selection of surface materials and/or surface topography. For example, displaceable bodies 58 may be manufactured from one or more elastomer materials, such as thermoplastic vulcanizate rubbers, ethylene propylene diene (EPDM) rubbers, polybutadiene rubbers, ethylene propylene rubbers, polyurethane, silicone, and the like, which can impart surface friction for each body 58. In some embodiments, displaceable bodies 58 may be manufactured from other materials, such as paper, fabrics, and the like, which may be used in combination with one or more elastomer materials, if desired.

The weight of each displaceable body 58 may also vary to produce the desired level of required radial force to release filament 56 from coil 54. For the above-discussed examples of filament 56, preferred weights for each displaceable body 58 include up to about 5 ounces, more preferably from about 0.1 ounces to about 3 ounces, and even more preferably from about 0.5 ounces to about 2 ounces.

In additional embodiments, displaceable bodies 58 may be hollow and/or may contain materials such as desiccants to assist in drying filament 56 during storage, transportation, and use with system 10. For example, at least a portion of displaceable bodies 58 may have hollow interiors that are at least partially filled with desiccants, and may include pores, slits or other openings to allow air and vapor to reach the desiccants.

Alternatively, at least a portion of displaceable bodies 58 may have thermoformed bodies that are filled with desiccants, and which may include openings covered by air and vapor-permeable membranes, such as membranes commercially available under the tradename TYVEK from E. I. du Pont de Nemours and Company, Wilmington, Del. In some embodiments, the thermoformed bodies and/or the membranes can be modified to introduce topographies and/or printed with tacky material patterns to increase their frictional resistance.

Figure 5:
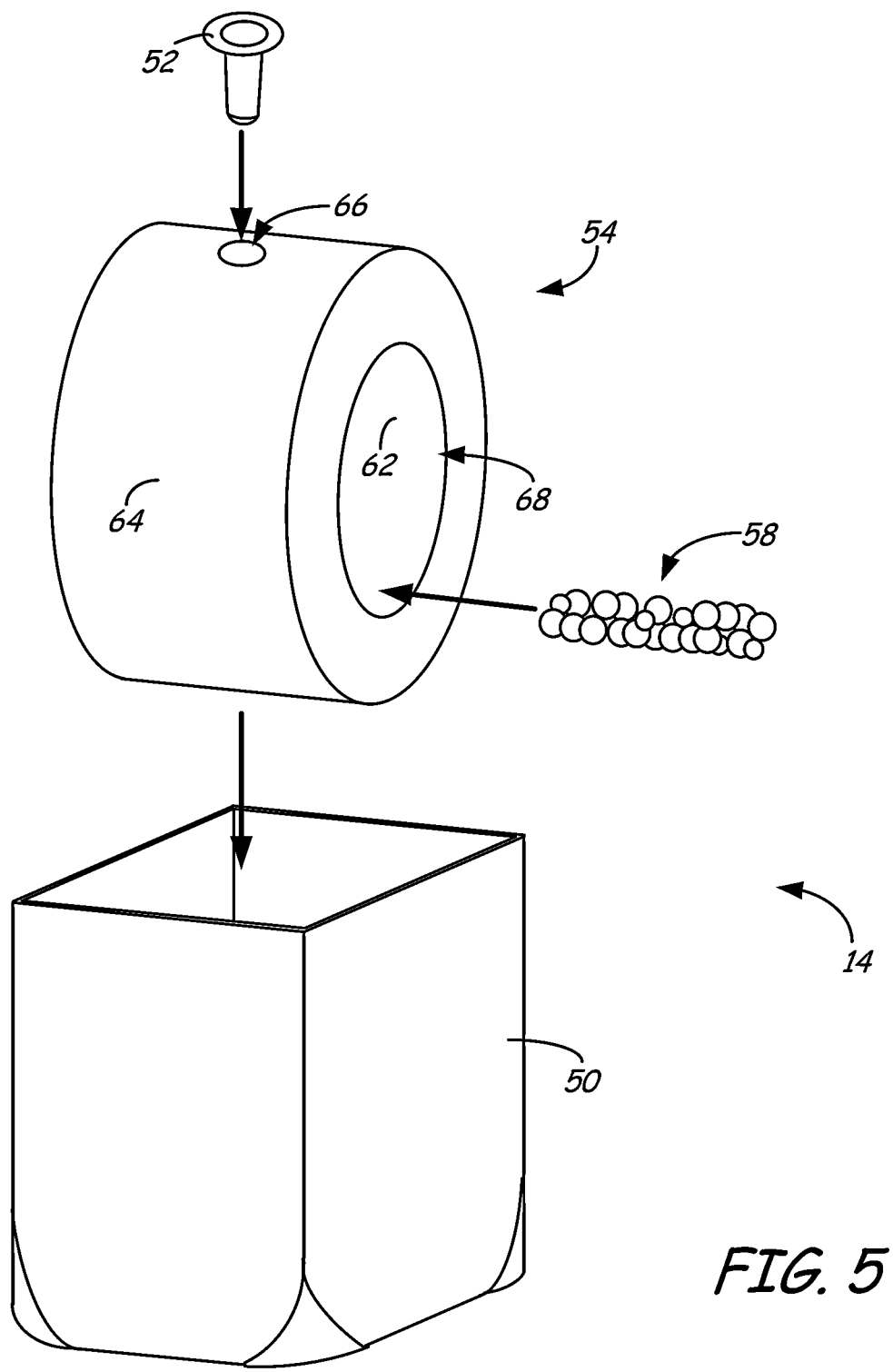
FIG. 5 is an exploded perspective view of a container portion of the consumable assembly, illustrating a manufacturing process.

As shown in FIG. 5, coil assembly 12 (or any other coil assembly of the present disclosure) may be manufactured by initially forming filament 56 (or other strand-based material, such as a cable, wire, rope, and the like), and winding filament 56 in a figure-8 pattern to form coil 54. Suitable winding techniques are known to those skilled in the art, such as those described in U.S. Pat. Nos. 2,767,938 and 4,406,419, and the references cited therein, and with winding systems commercially available from Reelex Packaging solutions Inc., Patterson, N.Y.

The winding technique preferably provides payout hole 66 that extends through coil 54 between inner layer 62 and outer layer 64. Payout tube 52 may accordingly be inserted into payout hole 66, and the leading end of filament 56 may be unwound from inner layer 62, and inserted through payout tube 52. Displaceable bodies 58 may also be inserted into core region 68, and the resulting assembly may be inserted into or otherwise encased in liner 50. Liner 50 may then be sealed to provide a gas and/or moisture barrier for coil 54 as discussed above, and to retain displaceable bodies 58 within core region 68.

Figures 6A, 6B:
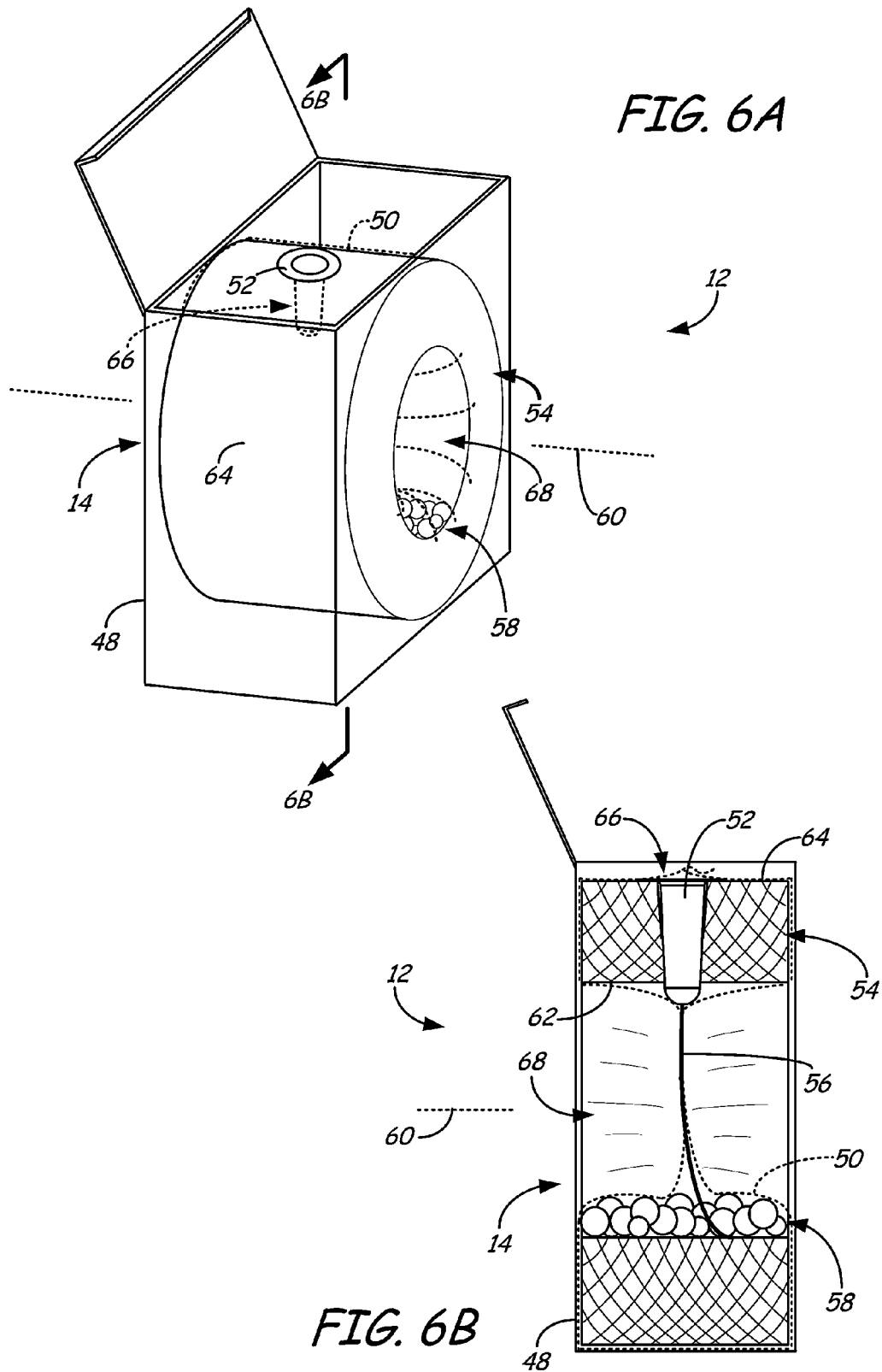
FIG. 6A is a top, front perspective view of the consumable assembly, illustrating a vacuum drawing step to collapse the liner.
FIG. 6B is a sectional view of section 6B-6B taken in FIG. 6A, illustrating the collapsed liner.

As shown in FIGS. 6A and 6B, in a preferred embodiment, after coil 54 (with payout tube 52 and displaceable bodies 58) is placed in liner 50, a vacuum may be drawn to collapse liner 50 around coil 54. As shown, this collapses liner 50 into core region 68 around payout tube 52, filament 56, and displaceable bodies 58, thereby restraining them in core region 68. As can be appreciated, this restricts the movement of displaceable bodies 58, preventing them from jostling around during transportation.

After being sealed in liner 50, the sealed coil 54 may then be placed in container 48 as further shown in FIGS. 6A and 6B. Guide tube 16 and print head 18 may also be placed in container 14, as discussed above. In this embodiment, guide tube 16 may initially be disconnected from payout tube 52, and liner 50 may be sealed over payout tube 52. This provides a gas and/or moisture barrier for coil 54 during transportation and storage, and allows any desiccants located within liner 50 (e.g., desiccant-containing displaceable bodies 58) to continue to absorb moisture from the environment within liner 50.

Prior to use in system 10, a user may puncture or otherwise open liner 50 at payout tube 52. This equalizes the pressure within liner 50, which releases liner 50 from its collapsed state and allows it to expand out of core region 68. Filament 56 and displaceable bodies 58 are then capable of moving freely within core region 68. The user may then feed the leading end of filament 56 through guide tube 16 and into print head 18, and secure the inlet end of guide tube 16 to payout tube 52. Guide tube 16 and print head 18 may then be removed from container 48 and mounted system 10, as discussed above, for printing 3D part 22 and/or support structure 24.

Figure 7A:
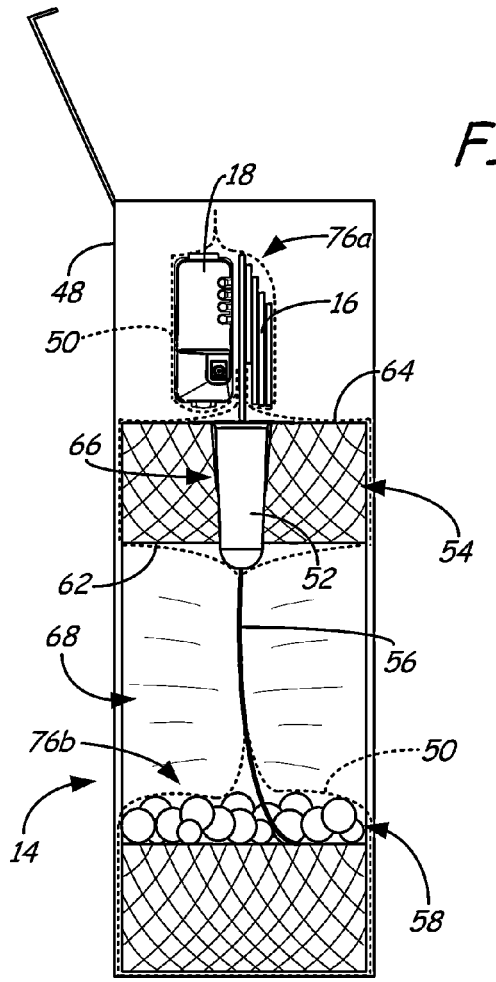
FIG. 7A is a sectional view of an alternative consumable assembly having a second upper liner, where the liner and the second upper liner are each in a collapsed state.
Figure 7B:
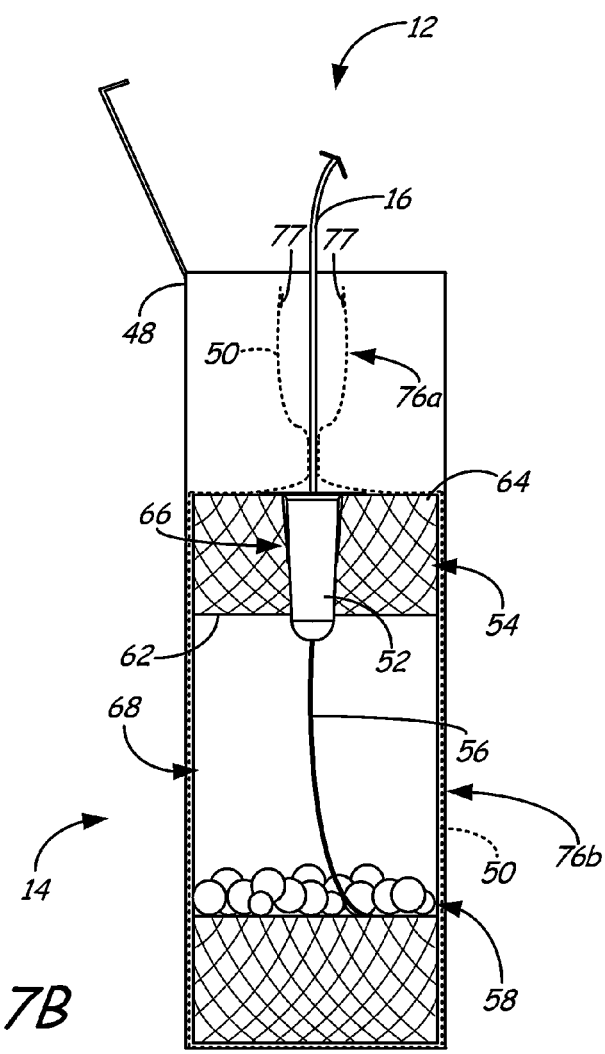
FIG. 7B is a sectional view of the alternative consumable assembly having the liner and the second upper liner in open and expanded states.

FIGS. 7A and 7B illustrate an alternative embodiment to coil assembly 12 as shown in FIGS. 6A and 6B. In this embodiment, guide tube 16 (and/or payout tube 52) preferably extends through an opening in liner 50, and may be secured to payout tube 52. As such, during manufacturing, filament 56 is preferably pre-fed into guide tube 16 and print head 18 for immediate use with system 10.

However, in comparison to the embodiment shown in FIGS. 6A and 6B, in this embodiment, liner 50 of coil assembly 12 is sealed to define upper pocket 76a and lower pocket 76b, where upper pocket 76a is shown retained in an extended top region of container 48. Lower pocket 76b may function in the same manner as discussed above for liner 50. Upper pocket 76a, however is a second sealable volume for storing guide tube 16 and print head 18 (or other coupling adapter). As shown in FIG. 7A, this arrangement allows guide tube 16 to remain engaged with payout tube 52, while also allowing a vacuum to be drawn through liner 50 to collapse lower pocket 76a of liner 50 into core region 68.

As shown, upper pocket 76a and lower pocket 76b may be formed by sealing (e.g., heat sealing) liner 50 at an intermediate location to form a dual compartment liner. In this case, lower pocket 76b is accessible through upper pocket 76a via an opening at payout tube 52 through which guide tube 16 extends, where guide tube 16 and/or payout tube 52 may be coupled to liner 50 at the intermediate seal (e.g., via hot melt glue and/or an eyelet piece). Additionally, upper pocket 76a is preferably resealable after being opened, such as with a reseal mechanism 77 (shown in FIG. 7). For example, reseal mechanism 77 may include a plastic zipper mechanism at the top seal of upper pocket 76a, such as those found on storage bags under the tradename ZIPLOC from S.C. Johnson & Son, Inc., Racine, Wis.

During manufacturing, liner 50 may be sealed under vacuum to restrain guide tube 16 and print head 18 (in upper liner 76), and filament 56 and displaceable bodies 58 (in liner 50) during transportation. Prior to use in system 10, a user may initially open upper pocket 76a. This equalizes the pressure within upper pocket 76a, which releases the restraint on guide tube 16 and print head 18.

Additionally, air may flow through print head 18 and guide tube 16 into lower pocket 76b, which equalizes the pressure within liner 50. This accordingly releases liner 50 from its collapsed state and allows it to expand out of core region 68, releasing the restraint on filament 56 and displaceable bodies 58. Guide tube 16 and print head 18 may then be removed from container 48 and mounted system 10, as discussed above, for printing 3D part 22 and/or support structure 24. During the printing operation, lower pocket 76b may remain sealed from ambient conditions other than through guide tube 16, thereby substantially maintaining a moisture and/or gas barrier to coil 52.

If desired, the user may also remove guide tube 16 and print head 18 from system 10 and reseal them in upper pocket 76a to prevent moisture from entering coil assembly 12 during storage. Thus, upper pocket 76a provides a dual function of maintaining a gas and moisture barrier for coil 54 with guide tube 16 and print head 18 connected, while also allowing liner 50 to collapse under vacuum to restrain displaceable bodies 58 during transportation.

FIG. 8 illustrates another alternative embodiment for coil assembly 12. In this embodiment, container 48 and liner 50 are deeper than coil 54, defining a lateral pocket 78. Lateral pocket 78 allows a greater number of displaceable bodies 58 to be loaded into container 48, building a reservoir supply of displaceable bodies 58. As discussed above, as filament 56 continues to unwind from coil 54, the diameter of inner layer 62 increases. The reservoir supply of displaceable bodies 58 allows additional numbers of displaceable bodies 58 to roll or otherwise fall into core region 68 under gravity to maintain a substantially constant coverage of displaceable bodies 58 over coil 54. This embodiment may also be combined with the vacuum collapsing of liner 50 to restrain displaceable bodies 58 during transportation, and with the use of upper liner 76.

As discussed above, in a second embodiment of the present disclosure, core region 68 includes "biasing bodies" that function as a permeable hub by defining a nip zone in core region 68 of coil 54. This is illustrated in FIG. 9, where coil assembly 12 includes a pair of biasing bodies 80 instead of displaceable bodies 58. Biasing bodies 80 may each be an inflatable bag or other medium retained within core region 68 by liner 50. Alternatively, biasing bodies 80 may be retained outside of liner 50.

As shown, biasing bodies 80 are compressed against each other within core region 68 to define nip zone 82. In this embodiment, nip zone 82 prevents filament 76 from releasing from coil 54 until a sufficient radial force is applied to pull filament 76 through nip zone 82. Preferred required radial forces include those discussed above for displaceable bodies 58. In effect, biasing bodies 80 function in a similar manner to displaceable bodies 58, where filament 76 is restrained by biasing bodies 80 at nip zone 82 rather than against coil 54 at bottom zone 74 (shown in FIGS. 4A-4E).

Accordingly, biasing bodies 80 preferably only allow a single loop of filament 56 to form at a time, where each loop preferably dissipates prior to a subsequent loop being formed. This prevents multiple loops from interacting and entangling with each other, as discussed above. Additionally, because biasing bodies 80 are retained laterally by liner 50, the compressive force applied at nip zone 82 is generally independent of the diameter of inner layer 62. As such, as the diameter of inner layer 62 increases during continued use, radial force required to pull filament 56 between biasing bodies 80 may remain substantially unchanged.

In a further embodiment of the present disclosure, biasing bodies 80 may be used in combination with displaceable bodies 58 to collectively function as a permeable hub for coil 54. Accordingly, the coil assemblies of the present disclosure (e.g., coil assemblies 12) have mechanisms, such as displaceable bodies 58 and biasing bodies 80, that preferably prevent multiple loops of filament 56 from releasing at the same time and interacting to entangle with each other. Such entanglement may otherwise prevent the inner winding from passing through the payout tube, potentially preventing further payout until the entanglement is removed.

As mentioned above, this can otherwise disrupt the printing operation in system 10, which relies on accurate timings of the deposited part and support materials, thereby impeding the printing operation. Moreover, the use of displaceable bodies 58 and biasing bodies 80 as permeable hubs of coils is also suitable for reducing or eliminating payout entanglement for a variety of different commercial and industrial applications, such as for providing electrical and/or communication cables, wire, rope, and the like.

EXAMPLES

The present disclosure is more particularly described in the following examples that are intended as illustrations only, since numerous modifications and variations within the scope of the present disclosure will be apparent to those skilled in the art. Example payout tubes of the present disclosure and comparative example payout tubes were tested for filament payout reliability with an additive manufacturing system.

Coil assemblies of Example 1 and 2 were prepared and tested for reliability against payout entanglements. The coil assembly of Example 1 included a coil of a cylindrical filament having an average diameter of about 0.050 inches of an acrylonitrile butadiene styrene (ABS) copolymer with a total volume of about 80 cubic inches. The core region of the coil was partially filled with seven rubber superballs to function as displaceable bodies.

Figure 10:
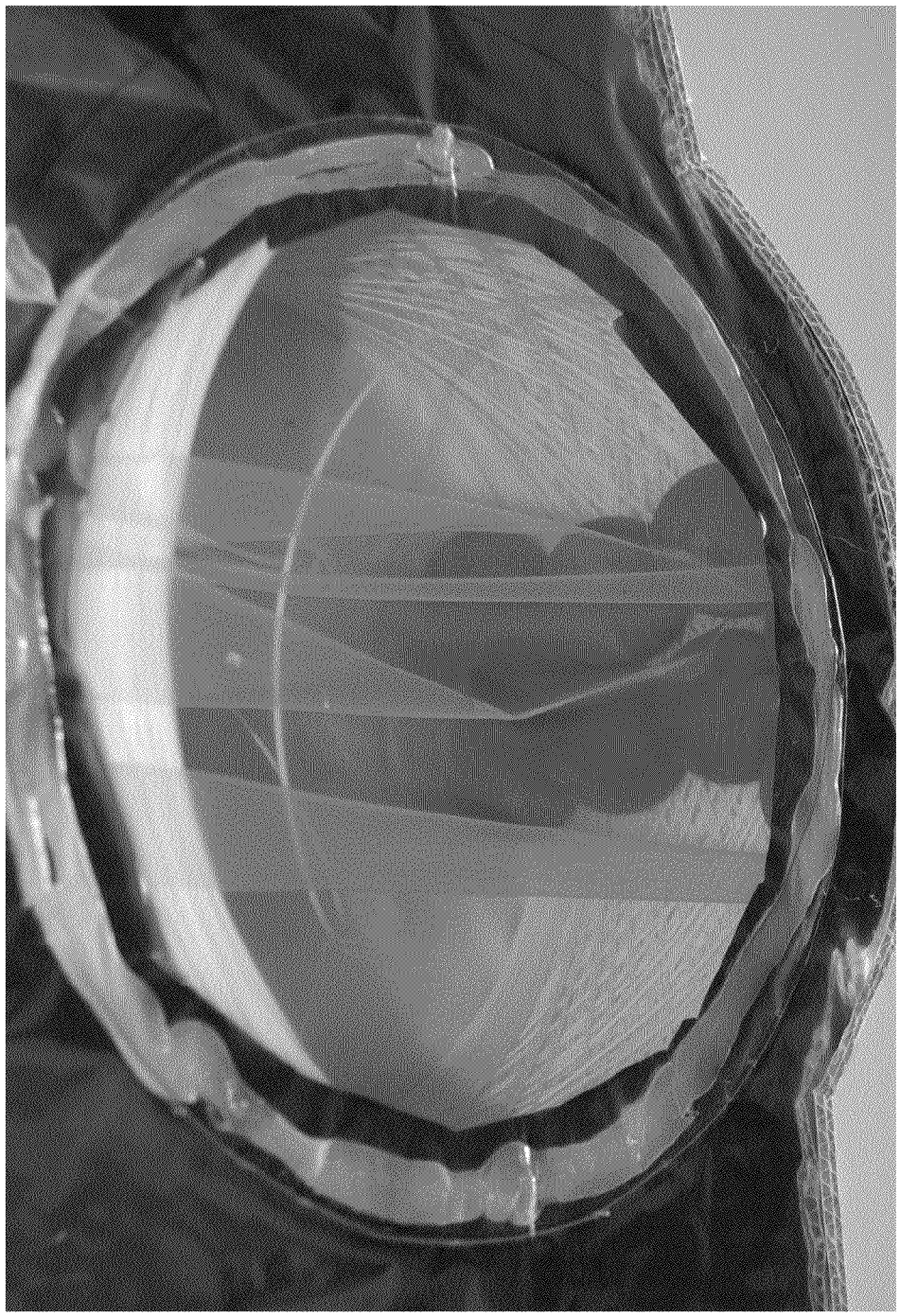
FIG. 10 is a photograph of an example consumable assembly of the present disclosure, as discussed below in the Examples section.

The coil assembly of Example 2 included a coil of a cylindrical filament having an average diameter of about 0.070 inches of an (ABS) copolymer with a total volume of about 900 cubic inches. The core region of the coil was partially filled with nine racquetballs to function as displaceable bodies, as shown in FIG. 10.

The coil assemblies of Examples 1 and 2 were then each tested for payout reliability by drawing the filament from its respective coil and providing the filament to a print head of an extrusion-based additive manufacturing system developed by Stratasys, Inc., Eden Prairie, Minn. under the trademarks "FDM" and "FUSED DEPOSITION MODELING". The entire length of each filament exited its respective coil assembly without any entanglement.

Furthermore, for each coil assembly, the displaceable bodies (i.e., the superballs and the racquetballs) only allowed a single loop of the filament to release from the coil at a time, which prevented the entanglement of multiple loops for occurring. Moreover, the radial forces required to release the filaments were substantially less than those required to efficiently draw the filaments to the print heads. Accordingly, the use of the displaceable bodies in the coil assemblies of Examples 1 and 2 effectively removed the multiple-loop behavior that otherwise leads to entanglements, allowing the coil assemblies to reliably deliver filaments for extended durations.

Although the present disclosure has been described with reference to preferred embodiments, workers skilled in the art will recognize that changes may be made in form and detail without departing from the spirit and scope of the disclosure.

The invention claimed is:

1. A coil assembly for use with an additive manufacturing system, the coil assembly comprising:
   a coil of a filament retained in a figure-8 configuration, and having a payout hole for dispensing successive segments of the strand-based material, the payout hole extending from an inner layer of the coil to an outer layer of the coil, wherein the inner layer of the coil defines a core region of the coil, and wherein the coil is configured to unwind loop by loop beginning from the inner layer and moving towards the outer layer as the strand-based material is drawn through the payout hole; and
   a plurality of individually displaceable bodies retained in the core region of the coil to define a nip zone at a bottom portion of the core region, wherein the individually displaceable bodies press against the inner layer of the coil at the nip zone to prevent the filament from forming more than one loop at a time in the core region as the filament is drawn through the payout hole.

2. The coil assembly of claim 1, wherein the filament comprises a ribbon filament.

3. The coil assembly of claim 2, wherein the individually displaceable bodies comprise spheroids having a size distribution of at least two different average diameters.

4. The coil assembly of claim 2, wherein at least a portion of the individually displaceable bodies comprise are configured to retain desiccant.

5. The coil assembly of claim 1, wherein at least a portion of the individually displaceable bodies each comprise an elastomer material.

6. The coil assembly of claim 1, and further comprising a liner, wherein the coil and the individually displaceable bodies are disposed in the liner.

7. The coil assembly of claim 1, wherein at least a portion of the individually displaceable bodies each have an average diameter ranging from about one inch to about three inches.

8. A coil assembly for use with an additive manufacturing system, the coil assembly comprising:
   a coil of a filament retained in a figure-8 configuration, and having a payout hole for dispensing successive segments of the filament, the payout hole extending from an inner layer of the coil to an outer layer of the coil, wherein the inner layer of the coil defines a core region of the coil, and wherein the coil is configured to unwind loop by loop beginning from the inner layer and moving towards the outer layer as the filament is drawn through the payout hole;

a plurality of individually displaceable bodies resting on the inner layer of the coil at a bottom portion of the core region, wherein the individually displaceable bodies prevent multiple loops of the filament from unwinding from the inner layer of the coil at the same time;

an adapter configured to engage the additive manufacturing system for printing a three-dimensional part in a layer-by-layer manner from the filament; and a guide tube having a first end configured to receive successive segments of the filament from the coil, and a second end coupled to the adapter for providing the successive segments of the filament to the adapter.

9. The coil assembly of claim 8, wherein at least a portion of the plurality of displaceable bodies comprise an elastomer material.

10. The coil assembly of claim 8, wherein at least a portion of the individually displaceable bodies are configured to retain desiccant.

11. The coil assembly of claim 8, wherein the adapter comprises a print head configured to be retained by the additive manufacturing system.

12. The coil assembly of claim 8, and further comprising a liner, wherein the coil and the individually displaceable bodies are disposed in the liner.

13. The coil assembly of claim 12, wherein the liner comprises a base pocket and a resealable pocket, wherein the coil and the individually displaceable bodies are disposed in the base pocket of the liner, and wherein the print head and the guide tube are configured to be retained in the resealable pocket of the liner.

14. The coil assembly of claim 8, and further comprising a payout tube disposed in the payout hole of the coil, wherein the first end of the guide tube is coupled to the payout tube.

15. A method of using a coil assembly with an additive manufacturing system, the method comprising:

providing a coil of a filament retained in a figure-8 configuration, which has a payout hole extending from an inner layer of the coil to an outer layer of the coil, wherein the inner layer of the coil defines a core region of the coil;

providing a plurality of individually displaceable bodies in the core region, wherein the individually displaceable bodies press inner windings of the filament against the inner layer of the coil to define a nip zone in the core region;

drawing the filament from the inner layer of the core region through the payout hole with a radial force, which releases a segment of the filament from the inner layer of the coil up to form a loop that extends to the nip zone;

continuing to draw the released segment of the filament to remove slack from the loop until the loop dissipates and the radial force is applied to a portion of the filament at the nip zone;

continuing to draw the released segment of the filament to pull the filament between the individually displaceable bodies at the nip zone; and continuing to draw the filament to release a second segment of the filament from the inner layer of the coil to form a second loop that extends to the nip zone.

16. The method of claim 15, wherein the coil and the individually displaceable bodies are retained in a moisture-resistant liner, and wherein the method further comprises maintaining a moisture barrier around the coil with the moisture-resistant liner.

17. The method of claim 16, and further comprising equalizing pressure within the moisture-resistant liner to release the moisture-resistant liner from the individually displaceable bodies.

18. The method of claim 16, wherein drawing the filament from the inner layer of the core comprises drawing the filament with a print head retained by an additive manufacturing system.

19. The method of claim 15, and further comprising drying the filament with desiccant retained by at least a portion of the individually displaceable bodies.

20. The method of claim 15, and further comprising:
increasing a diameter of the inner layer of the coil; and
introducing additional portions of the individually displaceable bodies from a supply reservoir into the core region of the coil having the increased diameter.

* * * * *